(12) United States Patent
Shaw et al.

(10) Patent No.: US 7,037,400 B1
(45) Date of Patent: May 2, 2006

(54) METHOD FOR FORMING INTERCONNECTIONS BETWEEN CHANNELS AND CHAMBERS

(75) Inventors: John Edward Andrew Shaw, Middlesex (GB); Chris Turner, Middlesex (GB)

(73) Assignee: British Nuclear Fuels plc, (GB)

( * ) Notice: Subject to any disclaimer, the term of this patent is extended or adjusted under 35 U.S.C. 154(b) by 0 days.

(21) Appl. No.: 09/600,837

(22) PCT Filed: Jan. 5, 1999

(86) PCT No.: PCT/GB99/00018

§ 371 (c)(1),
(2), (4) Date: Aug. 5, 2002

(87) PCT Pub. No.: WO99/34909

PCT Pub. Date: Jul. 15, 1999

(30) Foreign Application Priority Data

Jan. 6, 1998 (GB) .................................. 9800220

(51) Int. Cl.
*B32B 31/00* (2006.01)
(52) U.S. Cl. ....................... 156/268; 156/250
(58) Field of Classification Search ................ 156/250, 156/256, 257, 268, 510, 517
See application file for complete search history.

(56) References Cited

U.S. PATENT DOCUMENTS

| 3,811,474 | A | * | 5/1974 | Bauer et al. | ................. 137/833 |
| 5,099,311 | A | | 3/1992 | Bonde et al. | ................. 357/82 |
| 5,152,060 | A | | 10/1992 | Schubert et al. | ....... 29/890.039 |
| 5,681,484 | A | | 10/1997 | Zanzucchi et al. | ............. 216/2 |
| 5,704,992 | A | | 1/1998 | Willeke et al. | ............. 136/255 |
| 6,167,910 | B1 | * | 1/2001 | Chow | ......................... 137/827 |
| 6,321,791 | B1 | * | 11/2001 | Chow | ......................... 137/833 |
| 6,494,230 | B1 | * | 12/2002 | Chow | ......................... 137/827 |
| 6,503,409 | B1 | * | 1/2003 | Fleming | ...................... 216/56 |
| 6,648,015 | B1 | * | 11/2003 | Chow | ......................... 137/557 |

FOREIGN PATENT DOCUMENTS

| DE | 195 11 603 A1 | 10/1996 |
| WO | 95/05008 | 2/1995 |
| WO | 96/12540 | 5/1996 |
| WO | 96/12541 | 5/1996 |
| WO | 97/00442 | 1/1997 |
| WO | 98/25065 | 6/1998 |

OTHER PUBLICATIONS

International Search Report for corresponding PCT application No. PCT/GB99/00018.

* cited by examiner

*Primary Examiner*—James Sells
(74) *Attorney, Agent, or Firm*—Myers Bigel Sibley & Sajovec (57) ABSTRACT

A method of forming interconnections between channels and/or chambers for use in a micro-fluidic device. Two planer substrates (usually glass and silicon respectively) having etched channels are bonded together to form volmes where the channels overlap. A manifolding cut is then made through the glass, intersecting glass channels only. An organic solution is passed into cut, and flows through silicon channels. An aqueous solution is passed into cut, and flows through glass channels. The solutions meet in the region, where matter is transferred from one solution to another.

10 Claims, 8 Drawing Sheets

METHOD FOR FORMING INTERCONNECTIONS BETWEEN CHANNELS AND CHAMBERS

RELATED APPLICATIONS

The present application is a 35 U.S.C. §371 national phase application of PCT International Application No. PCT/GB99/00018, having an international filing date of Jan. 5, 1999, and claiming priority to Great Britain Patent Application No. 980220.7, filed Jan. 6, 1998, the disclosures of which are incorporated herein by preference in their entireties.

This invention relates to a method of forming interconnections between channels and chambers, and more particularly to such a method for use in micro-engineered fluidic devices.

Micro-engineered devices may be used to transport and control fluid flow. Such devices may be used in a variety of applications including chemical and physical analysis, chemical processing, and heat transfer. Micro-engineered fluidic devices for use in the transport of immiscible fluids are described in International Patent Applications WO 96/12540 and WO 96/12541.

The advantages of using micro-fluidic devices containing channels and chambers are:
1. Only small sample sizes are needed for analysis; and
2. Transport distances for chemical processing of fluids are usually small; and
3. Heat transfer is improved.

Channels and chambers are usually formed on planar substrates, and are hereinafter referred to as "channels". There is a need for the linking of individual channels for applications which require a high fluid throughput, as fluid flow in conventional micro-engineered devices may be very low. Channels may be produced by forming grooves or depressions on one or more faces of a substrate. Such substrates may then be bonded together. Vias may also be formed in the substrate, and may connect to channels formed therein.

A number of known methods are used to form channels on the faces of planar substrates. These include:
1. Etching using mask patterns defined by a lithographic process such as photolithography, screen printing, or direct writing; or
2. Cutting, milling, or drilling substrates by spark erosion, or laser ablation; or
3. Deposition or building up of layers on substrates according to patterns defined by lithographic processes; or
4. Electroplating through printing or photo-defined mask layers, including the use of X-ray lithography, as in LIGA (Lithographic Galvanoformung Abformung); or
5. The build up of substrates by bonding lamina, some of which may be cut to define a pattern of grooves or depressions; or
6. Mould replication or stamping of substrates defined by any of the above processes.

A common process is to form a fluid-handling micro-engineered device by anodic bonding of glass and silicon substrates having channels formed on one or both of the substrates.

Arrangements are known in the prior art for forming external connections and interconnections in substrates. External connections to channels are achieved by vias passing through to external faces of substrates, or by having channels extend to the edge of one or more of the substrates. Vias may be formed through one or more of the substrates to form interconnections between the channels. For simple devices with few external connections it is adequate to employ these methods. Methods for connecting capillaries to channels extending to the edge of a device composed of one or more substrates are described in UK Patent Application No. 9625491.7.

It is well established for electronic devices, that minimisation of the number of external input/output connections to arrays of charge pathways on a single substrate requires the routing of connections perpendicular to the substrate plane. This is achieved through the use of vias. The same topological requirements apply to fluidic devices where various feed and exit pathways connecting to channels should not intersect with each other, other than at the channel itself. For complex devices, a large number of external connections may be required.

Devices with vias and connections in multiple planar substrates correspond to the topological forms used to provide the dense connectivity required for integrated electronic devices. Within such electronic devices, charge pathways are defined in solid, self-supporting materials. The layers of material are usually thin enough to enable sufficient planarity to be maintained, allowing deposition, photolithography and etching to be carried out with good results.

In micro-fluidic devices, channels and vias are generally of larger dimensions than corresponding pathways and vias in integrated electronic devices. Channels are not self-supporting, as are the pathways in integrated electronic devices, because the formation of a channel, or a via, involves removing a volume of the substrate. Manufacture of channels and vias therefore contributes to fragility of the device, lowering yield during fabrication. This is especially true for vias, as they are formed perpendicular to the substrate plane. In addition, the difficulty of etching high aspect ratio vias (that is, a via whose length through the substrate is greater than its width) requires that the lateral dimensions of vias in the substrate plane are similar to (or often greater than) the thickness of the substrate in which they are formed. This last constraint may be overcome by use of techniques such as laser ablation or trench etching, but such techniques are expensive and not widely available.

It is particularly difficult to photo-define and etch mask layers within the area of a narrow channel formed by a previous fabrication sequence in a micro-fluidic device. This constraint dictates that channels for micro-fluidic devices fabricated by conventional procedures are produced with a relatively low density. This is especially true for vias. Consequently, the cost per device is increased.

Figure 1:
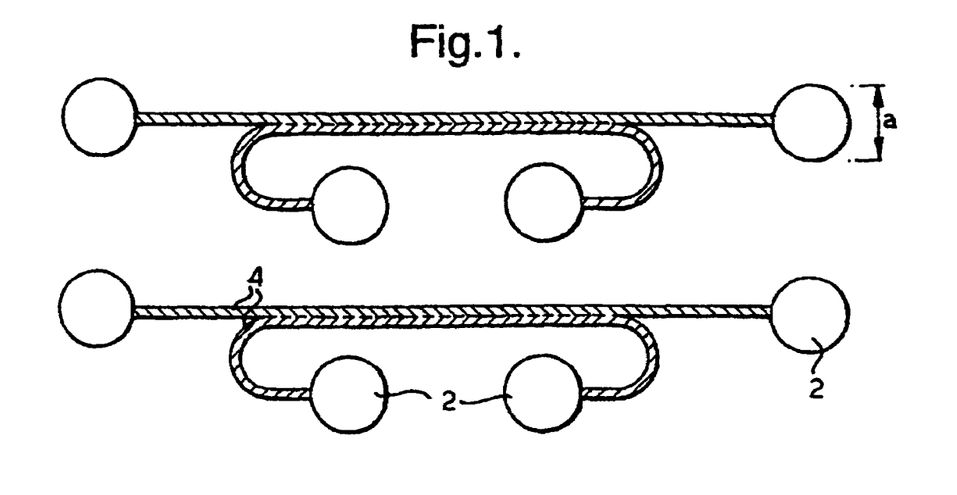
FIG. 1 shows a plan view of channels and chambers formed on a substrate, known in the prior art.

Typically, the density of channels formed on a substrate cannot be greater than that indicated in FIG. 1, where $\alpha$ is of the order of the thickness of the substrate. This applies to micro-contactor arrays with channels connecting to vias produced by anisotropic or isotropic etching of a substrate. It is therefore desirable that a way of allowing interconnection and manifolding of channels is found, without the problems of low density of channels, fragility of the device, or poor manufacturing yield.

An aim of the invention is to overcome the aforementioned problems by providing a method of constructing interconnections and/or manifolds in substrates, particularly, but not exclusively, for use in micro-fluidic devices.

According to a first aspect of the invention there is provided a method of connecting channels formed in at least one substrate by making at least one cut in at least one external face of said substrate, the cut being of sufficient depth to intersect one or more of said channels such that only the required interconnections are made by each cut.

According to a second aspect of the invention there is provided a method of connecting channels including a) forming at least one flow path in a first substrate; b) forming at least one flow path in a second substrate; c) contacting the first and second substrates to form at least one channel; and d) forming at least one cut in an external face of the first substrate, the cut being of sufficient depth to intersect one or more of the channels such that, in use, a fluid passing along a fluid pathway defined by the cut may pass into the or each channel.

Preferably the substrates are bonded before the cuts are formed therein, in order to maintain the physical integrity of a device incorporating the invention. The substrates may be bonded via anodic or thermal bonding, or by gluing using suitable adhesives such as epoxy, acrylic, or UV curing adhesives.

The method may also include the step of making at least one cut in an external face of the second substrate, the cut being of sufficient depth to intersect one or more of said channels such that only the required interconnections are made by the at least one cut.

The method preferably includes the steps of a) forming at least one flow path in a third substrate and b) joining the third substrate to the first and second substrates.

Advantageously the at least one cut formed in the first substrate and the at least one cut formed in the second substrate are off-set in order to maintain the physical integrity of a device incorporating the invention.

The at least one cut is preferably formed substantially perpendicular to the plane of the substrate.

Cuts may be produced by micro-engineering sawing methods, which can be controlled to within 10 μm. Alternatively, it is possible to use mechanical milling, as long as the equipment used is of relatively high precision. Laser ablation, or photolithography and chemical etching may also be applied to produce the manifolding channels. Although, in general, mechanical cutting or milling systems are preferred.

According to a further aspect of the invention there is provided an apparatus for transporting at least one fluid, the apparatus including at least a first substrate and a second substrate which have portions removed therefrom, so as to define at least one channel, the at least one channel being interconnected according to the aforedescribed method.

Preferably the apparatus further includes a third substrate. The third substrate may be situated between the first and second substrates, or adjacent the second substrate.

Preferably the first substrate is glass.

Preferably the second substrate is silicon.

If the third substrate is situated between the first and second substrates, the third substrate is preferably a mesh of, for example, copper or steel. Alternatively, it may include a polymer. The third substrate is preferably between 1 and 10 micrometers thick.

Where the third substrate is situated adjacent the first or the second substrates, the third substrate is preferably glass. The third substrate may have portions removed therefrom so as to define at least one channel.

Preferably the substrate is a square approximately $5 \times 10^{-2}$ m by $5 \times 10^{-2}$ m.

The channels may be substantially straight or curved.

Preferably the channels are between $1 \times 10^{-2}$ m and $5 \times 10^{-2}$ m in length.

The invention may be incorporated into a micro-fluidic (or other) device.

Fluids used within the device may either be miscible or immiscible. Aqueous and/or organic material may be used within the device.

Preferred embodiments of the invention will now be described, by way of example only, with reference to the accompanying Figures, wherein:

FIG. 7 shows a cross-section of two bonded planar substrates along line v—v' of FIG. 6a;

Figure 2:
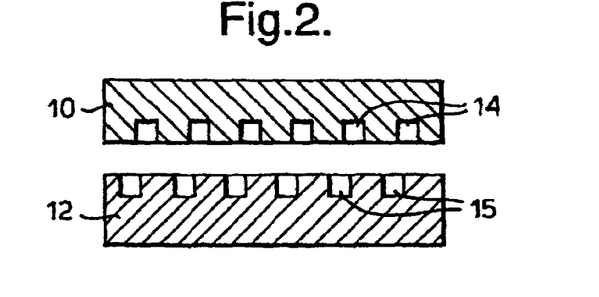
FIG. 2 shows a cross-section of two planar substrates containing channels.
Figure 3A:
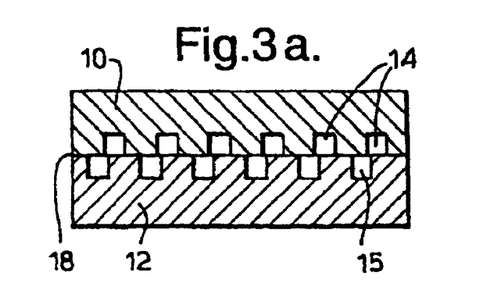
FIGS. 3a and 3b show a cross-section of two bonded planar substrates containing channels.
Figure 3B:
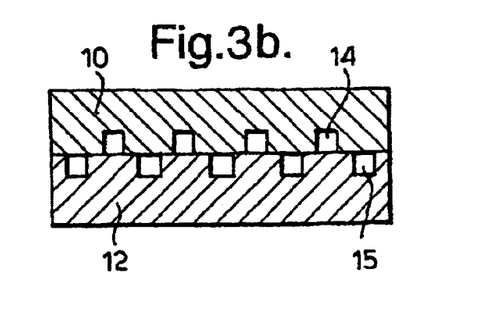

Referring to FIG. 2, channels 14 are formed on a surface of planar substrate 10, which in this case is glass. Channels 15 are also formed on a surface of planar substrate 12, which is this case is silicon. Vias needed to interconnect the individual channels are not formed at this stage. Substrate layers 10 and 12 are then bonded together to form channels 14 and 15, as shown in FIGS. 3a and 3b. The substrates may be bonded using epoxy adhesive such as EpoTek™353 ND, or UV curing acrylic adhesive such as Norland Optical adhesive type 81.

Figure 4A:
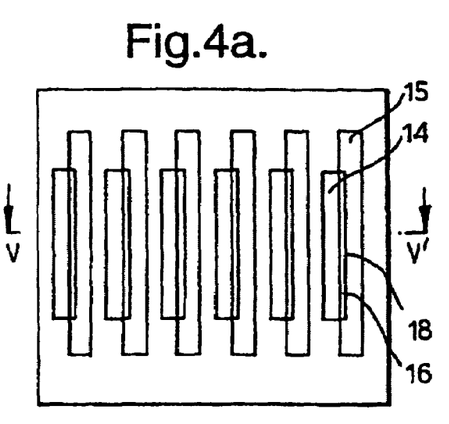
FIGS. 4a and 4b show a plan view of two bonded planar substrates shown in FIG. 3.
Figure 4B:
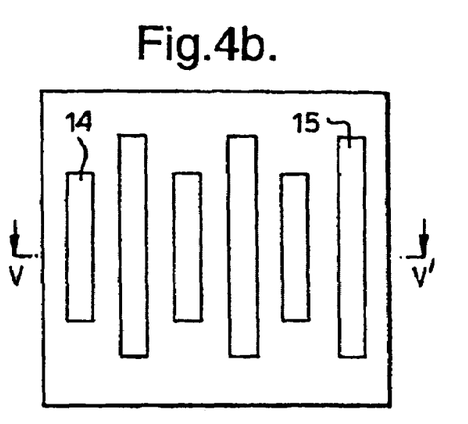

From FIGS. 3a and 4a, it can be seen that the channels 14 in substrate 10 overlap channels 15 in substrate 12 to provide regions where fluids flowing in the respective channels 14, 15 contact at an interface 18. In an alternative embodiment, however, channels 14 and 15 do not overlap and there is no interface between the channels. This embodiment is shown in FIGS. 3b and 4b.

Figure 5A:
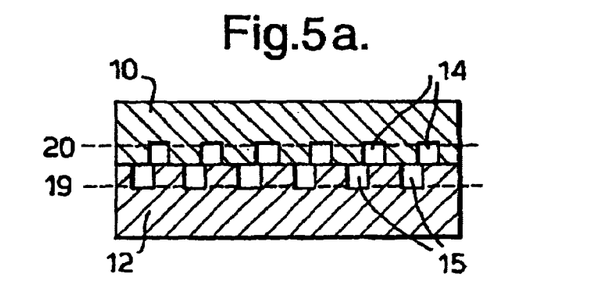
FIGS. 5a and 5b show a cross-section along line v—v' of FIGS. 4a and 4b respectively, where manifold cuts have been made in the substrates, in accordance with the present invention.
Figure 5B:
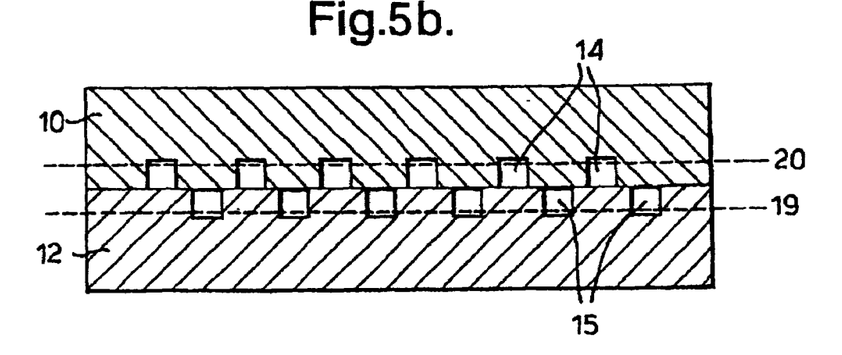
Figure 6A:
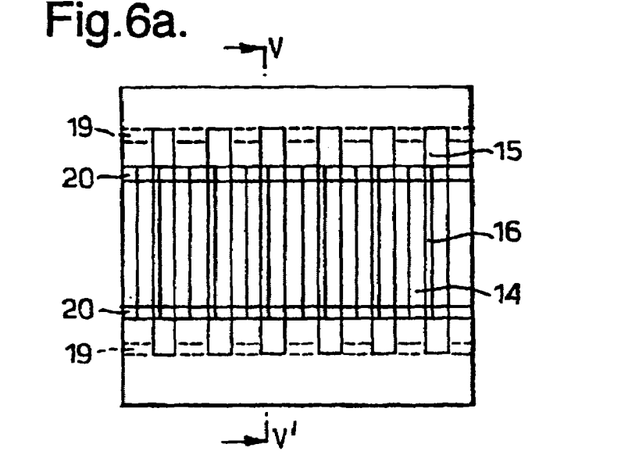
FIGS. 6a and 6b show a plan view of two bonded planar substrates shown in FIGS. 3a to 5a and FIGS. 3b to 5b respectively, where manifold cuts have been made in the substrates.
Figure 6B:
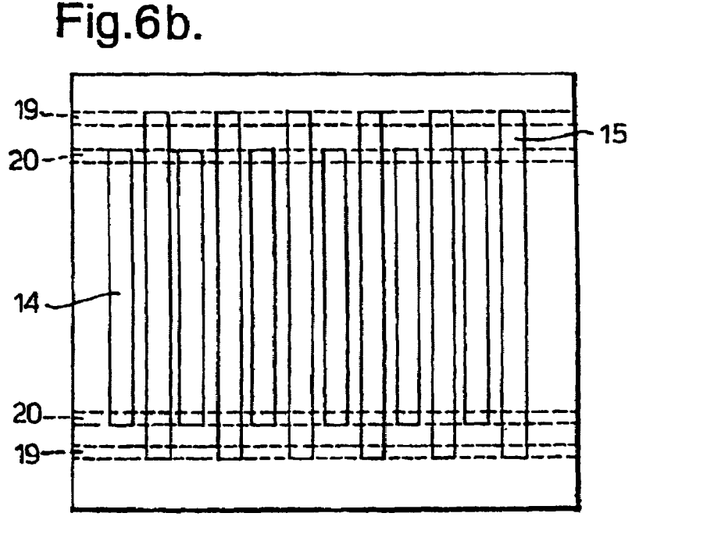

Interconnections or manifolds to groups or arrays of channels 14 or 15 are formed by cuts 19, 20 made into one or more of the external faces of the bonded substrates 10 and 12, as illustrated by FIGS. 5 and 6. FIGS. 5a and 6a show bonded substrates where channels 14 and 15 overlap to form an interface 18, whereas FIGS. 5b and 6b shows bonded substrates where channels 14 and 15 do not overlap. The position and depth of these cuts is such that only required connections to respective channels 14 or 15 are made by each cut. Cuts 20 made to substrate 10 should not extend deeply into substrate 12 so that the physical integrity of the assembled device is maintained. For channels which are 40 micrometers in depth, cuts made to an accuracy of approximately 10 micrometers are adequate.

Figure 7:
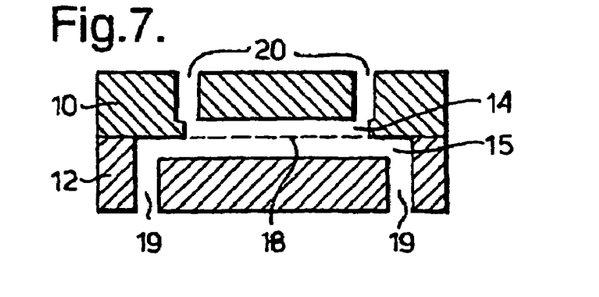
Figure 8:
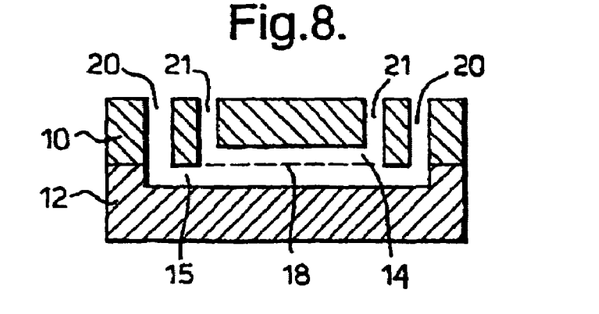
FIG. 8 shows a cross-section of a further embodiment of the invention showing two bonded planar substrates containing channels, where manifold cuts have been made in one substrate only.
Figure 9:
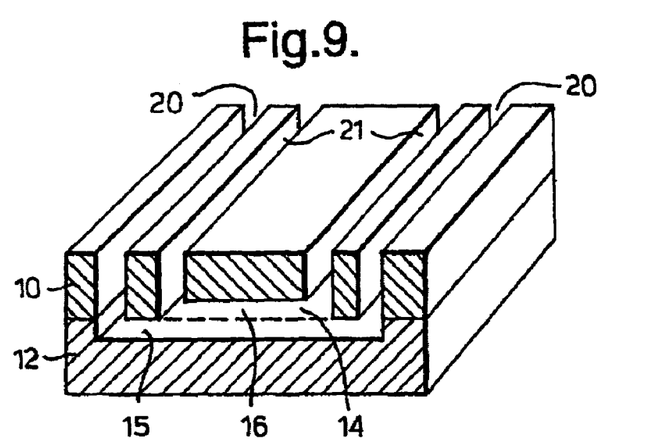
FIG. 9 shows an oblique view of the embodiment shown in FIG. 8.

Two methods for forming manifolds will now be discussed. FIG. 7 shows a first embodiment, where the manifolds 19 and 20 are cut in both substrate layers 12 and 10 respectively, and are offset. Cut 19 is made through substrate 12 only, to intersect channels 15. Cut 20 is made through substrate 10 only, to intersect channels 14. FIG. 8 shows a further embodiment of the invention, where manifolds 20 and 21 are cut in the same substrate 10. Cut 20 is made through substrate 10, and is deep enough so that it intersects with channels 15 in substrate 12. Cut 21 is also made through substrate 10, but its depth is less than that of cut 20, so that it only intersects with channels 14 in substrate 10.

Where both substrates contain cuts, as in FIG. 7, the cuts should be offset, or positioned so as not to weaken the device. Formation of the interconnections generally involves at least some of the cuts through a substrate sufficiently to intersect the channels 14, 15 to be linked, and not continuing through to the interface 18 between bonded substrates 10, 12.

Where one of the substrates is transparent (substrate 10 in this case), it is advantageous to form all the manifold cuts through the transparent substrate, as in FIGS. 8 and 9. This allows more precise alignment of the cuts with the channels on further substrate layers.

Figure 10:
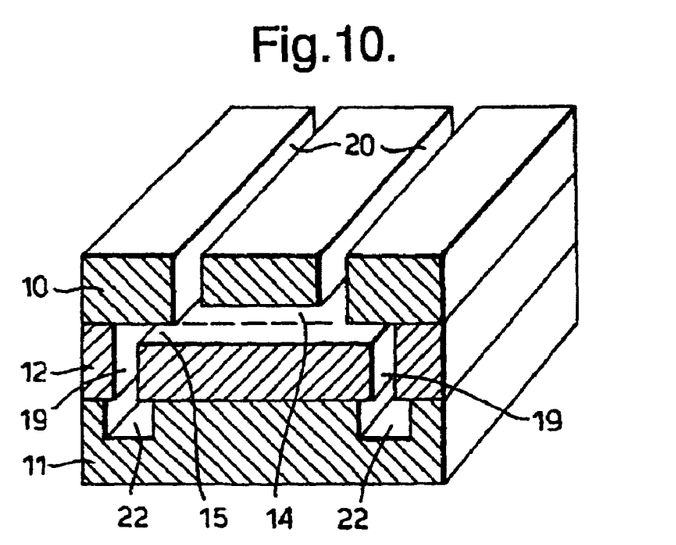
FIG. 10 shows an oblique view of a further embodiment of the present invention.

The examples shown diagrammatically in FIGS. 2 to 9 are that of a micro-contactor. Similar steps may be taken to form other micro-fluidic devices from various planar substrates, provided that such substrates can be bonded and accurately cut. For example, in FIG. 10, substrate 11 having manifold cuts 22, is bonded to substrates 10 and 12, which themselves contain manifold cuts 19 and 20. The resulting device has an increased manifold cross-section, and flow capacity is increased.

The depth of cuts 19 is not critical, as long as the cuts are deep enough to intersect with the channel which is to be connected with the cut, and does not pass far enough into a further substrate to weaken the assembly. For a micro-contactor, it is required that the manifolding connections do not cross the interface between the channels 14 and 15. If manifolding connections cross the interface, fluids tend to mix, and establishment of a stable fluid interface position is prevented. This is important for manifolding positions 21 shown in FIG. 8, where pairs of contactor channels 14 and 15 intersect the plane of the manifold cut. Here it must be ensured that the depth of the cut is limited to a range sufficient to intersect predetermined channels 14 and 15 etched into the substrate being cut, while not allowing the cut to reach the interface between the substrates.

The restriction on the depth of manifold cuts applies to structures other than micro-contactors.

Figure 12:
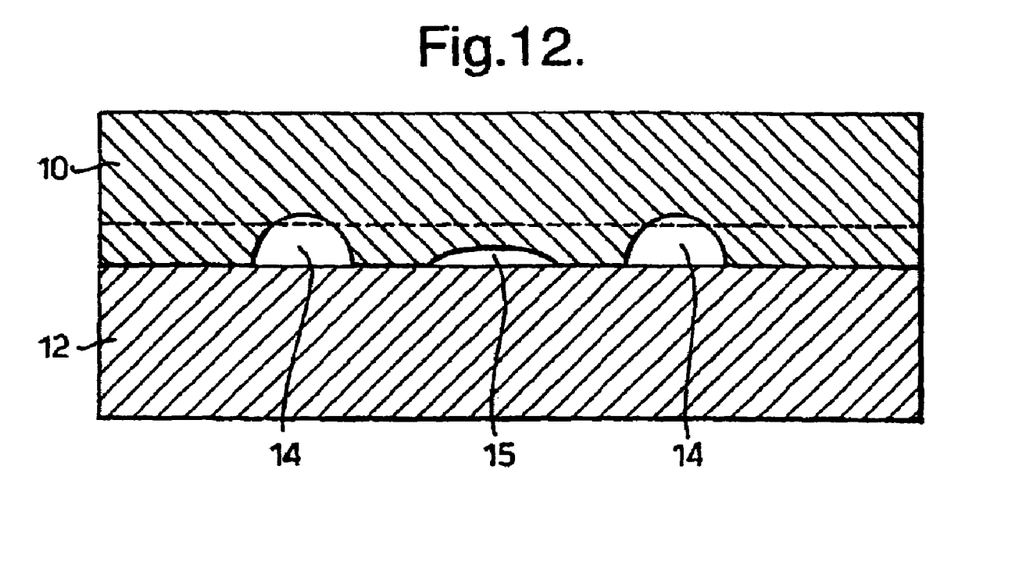
FIG. 12 shows a further embodiment of the invention showing two bonded planar substrates containing two sets of channels, where manifold cuts have been made to link one set of channels only.

The method of the invention may also be applied to any fluidic structure where it is required that channels to be interconnected may not intersect another set of channels. Here, channels 14 and 15 are formed in a layer of substrate 10. Channels 14 are deeper than channels 15, so that manifolding cuts made to connect channels 14 do not link channels 15. An example of this is shown in FIG. 12. This concept may be of use in a heat exchanger, for example. In addition to channels 14, 15 carrying fluids, the channels may be an electronically conducting conduit, or a light guide or other structure situated between the channels to be connected, but which must remain isolated from the manifolding.

Figure 13A:
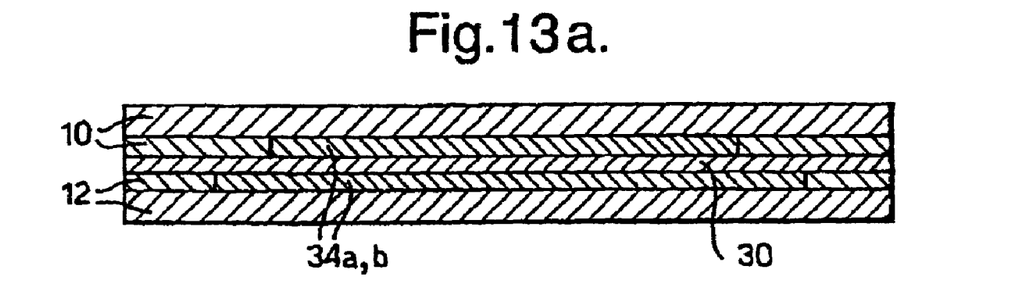
FIG. 13a shows a cross-section of a laminated structure.
Figure 13B:
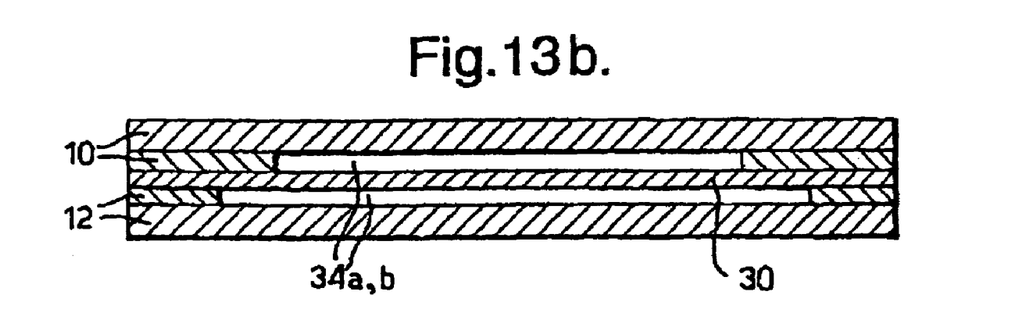
FIG. 13b shows a cross-section of a laminated structure having chambers formed therein.

FIGS. 13a and 13b show a cross-section of a bonded, layered structure in which manifold cuts have not yet been formed. The bonded structure shown in FIG. 13a includes a thin middle layer 30 of substrate, the central portions of which are bonded to an upper substrate layer 32a, and a lower substrate layer 32b. The outer regions of one side of layer 30 are bonded to a first substrate layer 10, and the outer regions of the other side of layer 30 are bonded to a second substrate layer 12. Material 32 (which is in contact with the central portions of layer 30) can be dissolved or melted out at a later stage. Layers 32a,b may, for example, contain a polymer or a polymer/wax mix, a metal such as copper, or an alloy such as steel which may be in the form of a mesh. The layers of material 32a and 32b are further bonded to respective layers of substrate 10 and 12, such that when the material 32 is removed, respective chambers 34a and 34b are formed in the substrate layers 10 and 12.

The laminated structure may, alternatively, be formed by bonding the outer regions of one side of layer 30 to a first substrate layer 10, and on the other by a second substrate layer 12, the substrate layers 10 and 12 having cut-away portions so as to form chambers 34a,b without the need for layers 32a,b. Such a laminated structure is shown in FIG. 13b. This structure provides less support than that shown in FIG. 13a, but the outer uncut layers 10, 12 provide physical stability to the whole structure during assembly and bonding, thus reducing distortion of the layered structure.

Figure 14A:
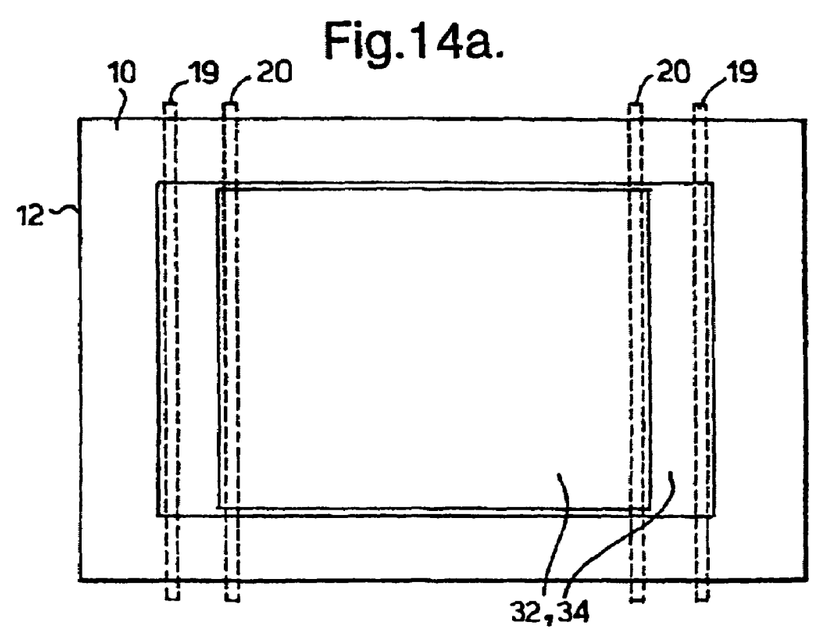
FIG. 14a is a plan view of the laminated structures of FIG. 13 showing the positions of manifold cuts.
Figure 14B:
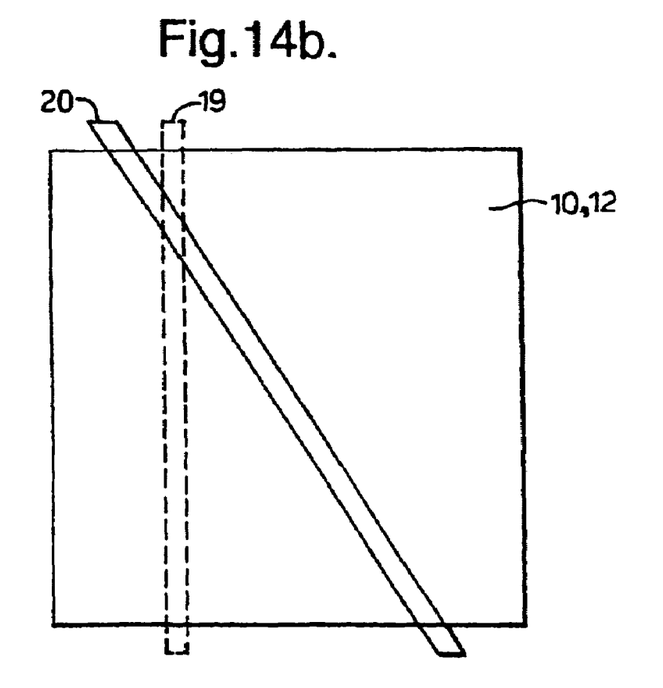
FIG. 14b is a plan view of a laminated structure, showing the positions of manifold cuts at an angle to one another.

FIG. 14a shows a plan view of the laminated structures of FIGS. 13a and 13b, indicating the positions of the manifolding cuts 19 and 20. In this structure, the manifolding cuts 19 and 20 run parallel to each other. However, the manifolding cuts may be made so that they are at an angle to each other, as shown in FIG. 14b. The angle should be high enough in order that the device is not weakened.

Figure 15A:
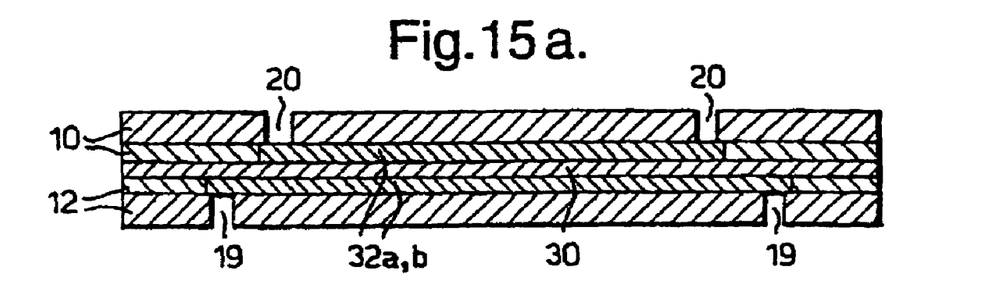
FIGS. 15a to 15d show plan views of the laminated structures of FIG. 13 having manifold cuts.
Figure 15B:
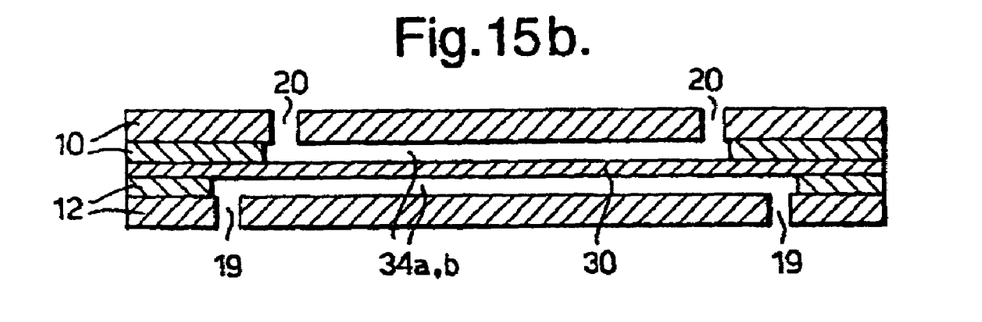
Figure 15C:
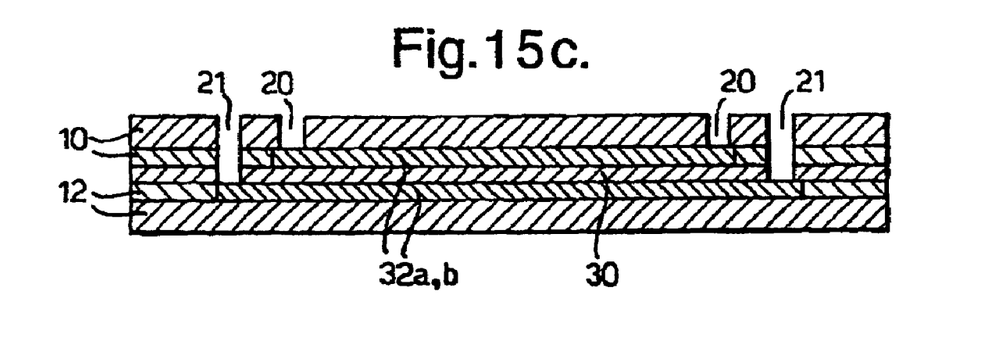
Figure 15D:
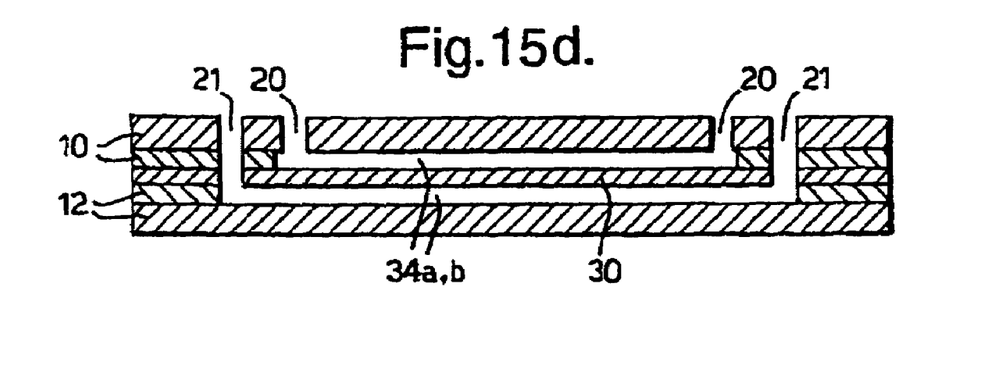

FIGS. 15a to 15d show cross-sections of the laminated structures of FIGS. 13a and 13b having various manifolding cuts formed therein. FIG. 15a shows a laminated structure having manifolding cuts 20 and 19 formed in substrates 10 and 12 respectively. In this case, the cuts are made as far as layers 32a,b. The material 32 is then removed (as previously discussed) in order to form chambers 34a,b which are connected to channels 20 and 19. Cuts 19 and 20 are offset so as not to weaken the device. FIG. 15c shows a layered structure having manifolding cuts 20 and 21 made in the external face of substrate 10. Cut 20 extends to the upper layer 32a, and cut 21 extends (via layer 30) to the lower layer 32b. When the material of layers 32a and 32b is removed, respective chambers 34a and 34b are formed. Chambers 34a and 34b are linked via manifolding cuts 20 and 21, respectively.

Figure 11:
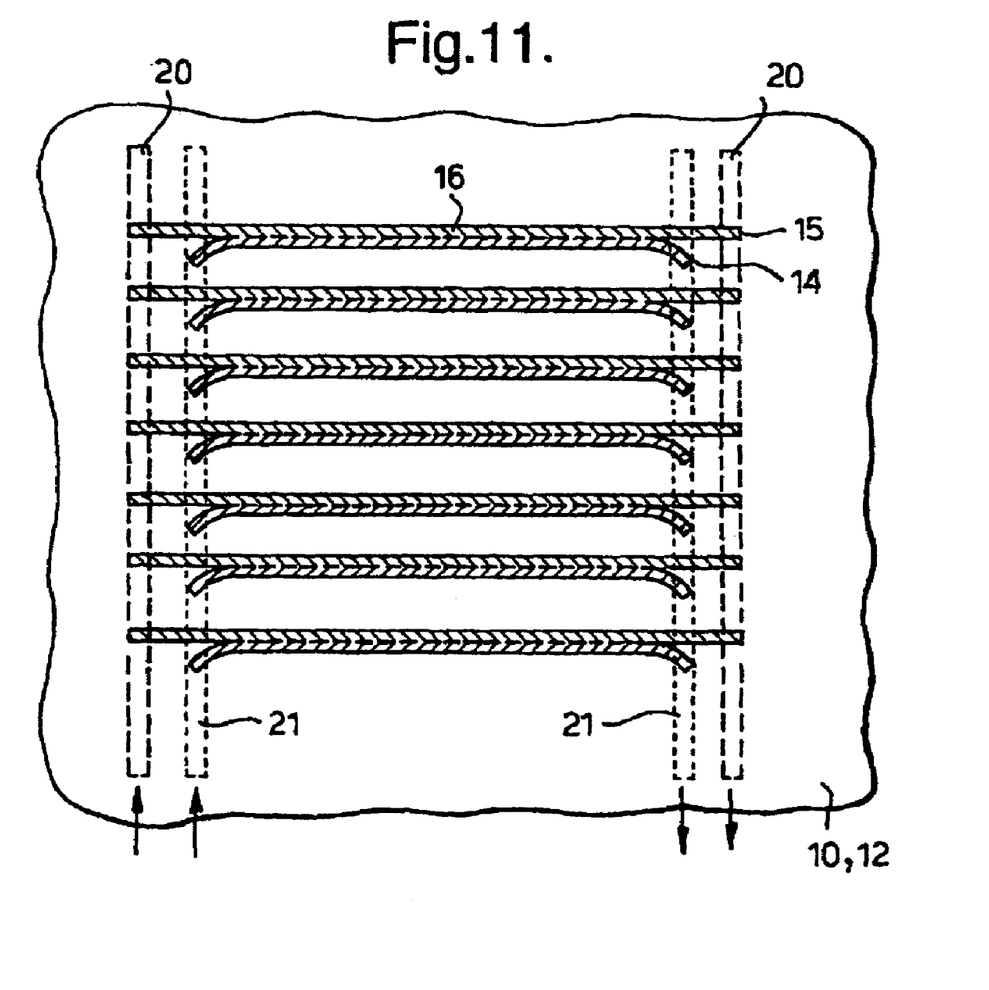
FIG. 11 shows a plan view of a device incorporating the invention.

FIG. 11 shows a schematic plan view of a device having a number of channels 14, 15 and manifold cuts 20, 21. The structure of the device is the same as that shown in FIGS. 8 and 9. Organic material passes through channels 15 formed in silicon substrate 12 via manifolding cuts 20. Cuts 20 pass through the glass substrate 10 and silicon substrate 12 in order to intersect channels 15 formed in the silicon substrate 12. Aqueous material flows in channels 14 formed in glass substrate 10 via manifolding cuts 21. Here the organic material used in a mixture of Xylene and TBP (tributylphosphate) containing dissolved iron ions ($Fe^{3+}$), and the aqueous material is hydrochloric acid. Where channels 14 and 15 meet, the aqueous and organic materials come into contact. There is a transfer of iron ions from the organic material to the aqueous material. This reaction is an example of a liquid—liquid solvent extraction process and is used, for example, in the pharmaceutical and nuclear industries. The organic and aqueous materials then exit from the device.

Devices produced using this method may have 120 microcontactors of length 14 mm, formed in an area of substrate 50 mm square. This is approximately ten times the density of channels achievable using past methods of etching through a substrate and using structures such as those shown in FIG. 1 having vias 2 and channels 4. Fluid flow and transfer rates for devices produced using the present invention have improved by a factor of 120 over the methods in the prior art.

In summary, devices manufactured according to the method of forming interconnections of channels as herein described has the following advantages:

1. better utilisation of space/higher packing density of channels than other methods;
2. improved yield as the channels formed in one substrate are supported by another substrate;
3. improved yield due to the substrates being less likely to break during the bonding process than using other methods; and
4. improved strength of the assembled device.

The invention has been described by way of a number of embodiments and it will be appreciated that variation may be made to these embodiments without departing from the scope of the invention.

The invention claimed is:

1. Method of connecting channels including a) forming at least one flow path in a first substrate; b) forming at least one flow path in a second substrate; c) contacting the first and second substrates to form at least one channel and d) forming at least one cut in an external face of the first substrate, the cut being of sufficient depth to intersect one or more of the channels such that, in use, a fluid passing along a fluid pathway defined by the at least one cut may pass into the at least one channel, characterised in that the substrates are bonded before the at least one cut is formed therein.

2. Method according to claim 1 including the step of making at least one cut in an external face of the second substrate, the cut being of sufficient depth to intersect one or more of said channels such that only the required interconnections are made by the at least one cut.

3. Method according to claim 2 including the steps of a) forming at least one flow path in a third substrate and b) joining the third substrate to the first and second substrates.

4. Method according to claim 1 wherein the at least one cut formed in the first substrate and the at least one cut formed in the second substrate are off-set.

5. Method according to claim 1 wherein the at least one cut formed substantially perpendicular to the plane of the substrate.

6. Method according to claim 1 wherein the cuts are formed by sawing.

7. Method according to claim 1 wherein the cuts are formed by mechanical milling.

8. Method according to claim 1 wherein the cuts are formed by laser ablation.

9. Method according to claim 1 wherein the cuts are formed by photolithography.

10. Method according to claim 1 wherein the cuts are formed by chemical etching.

\* \* \* \* \*